June 26, 1962     O. W. SEPP, JR     3,041,022
PARACHUTES

Filed March 21, 1961     6 Sheets-Sheet 1

INVENTOR.
OSCAR W. SEPP, JR.
BY
Burgess, Ryan & Hicks
ATTORNEYS

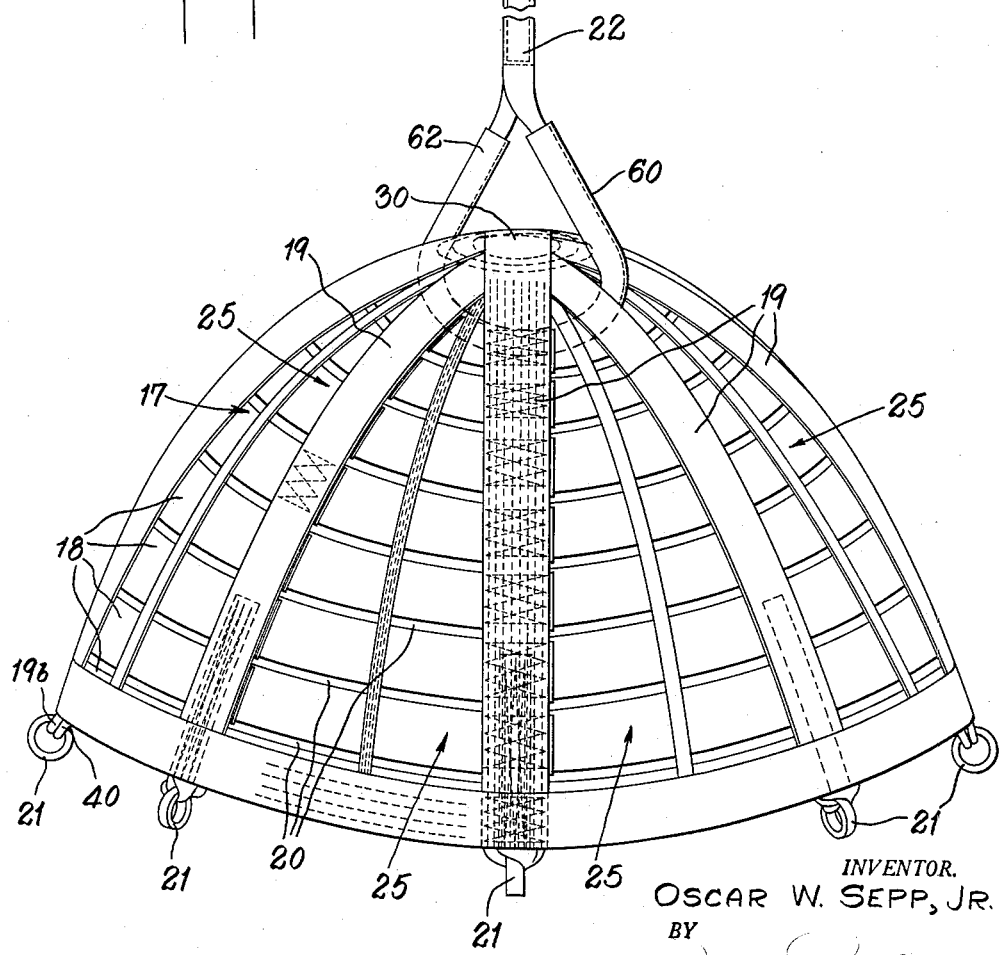

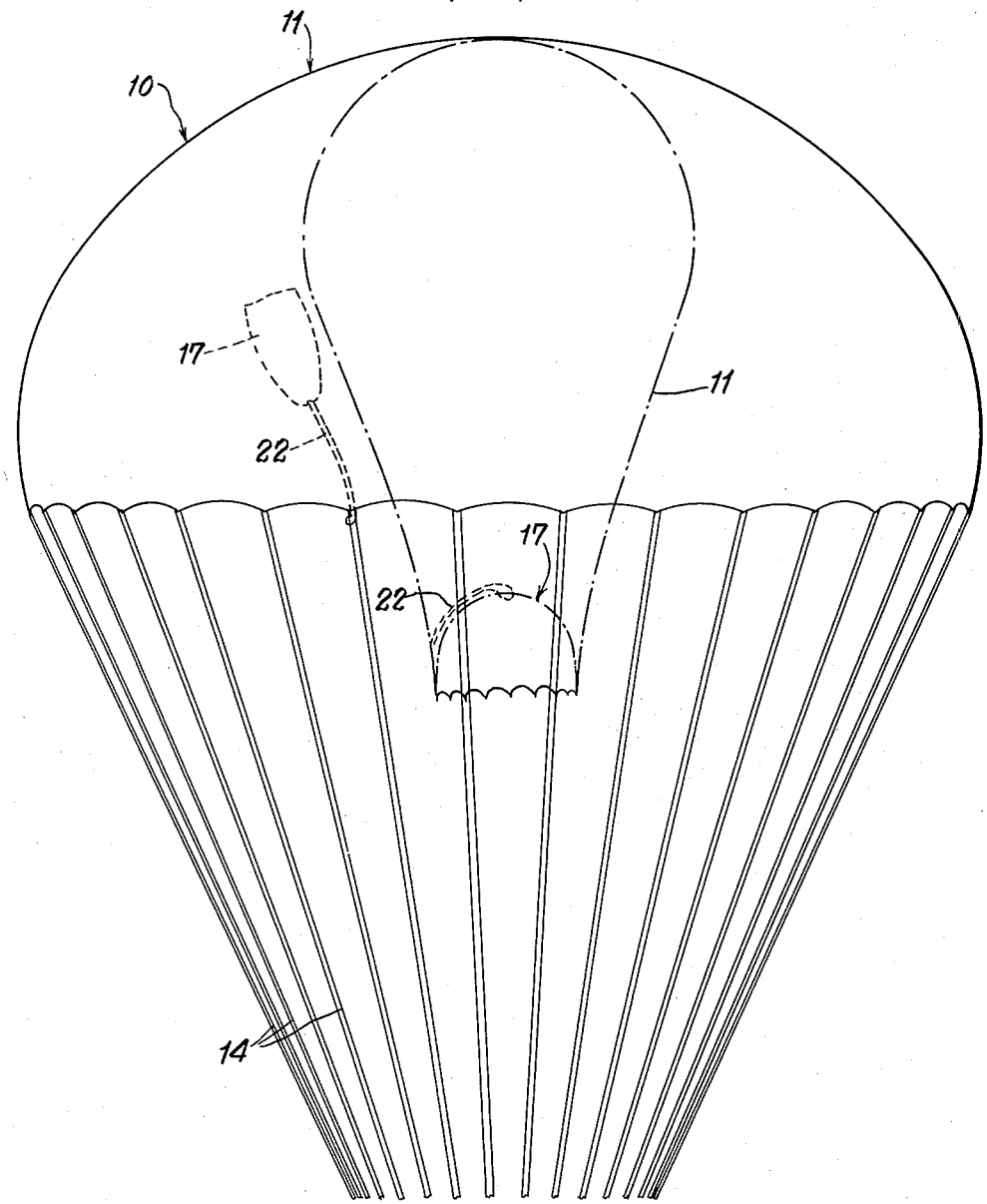

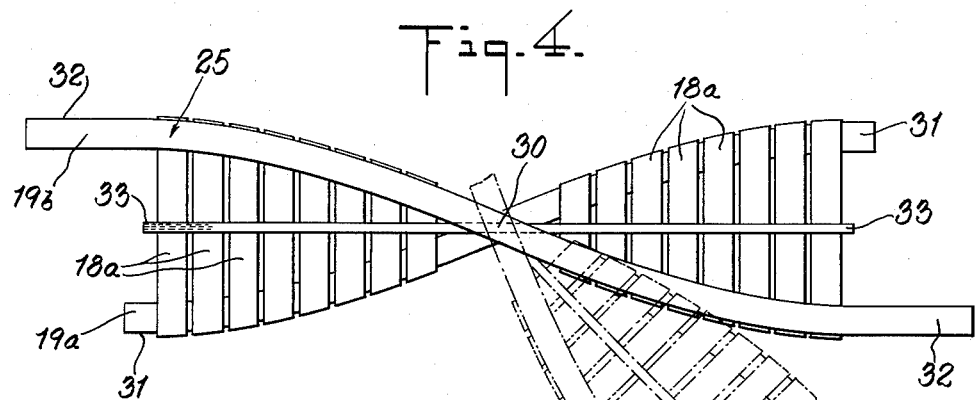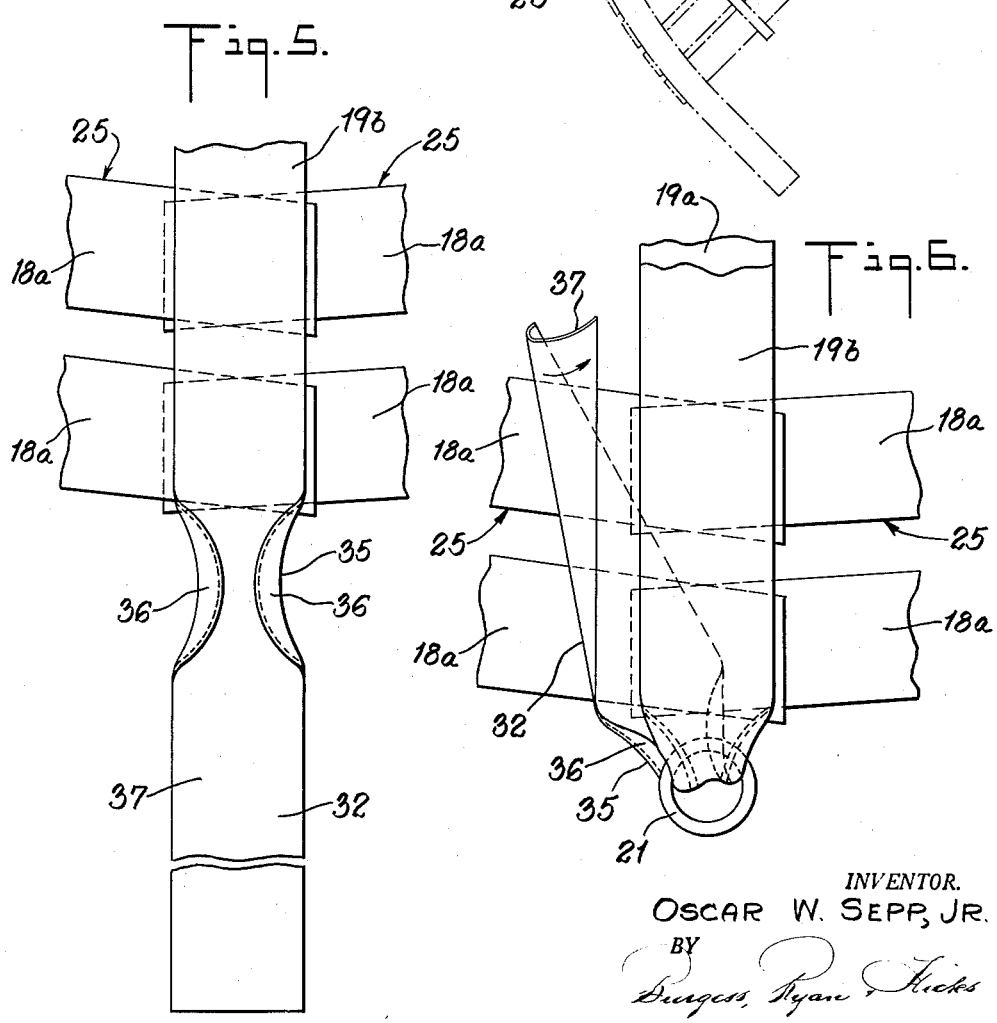

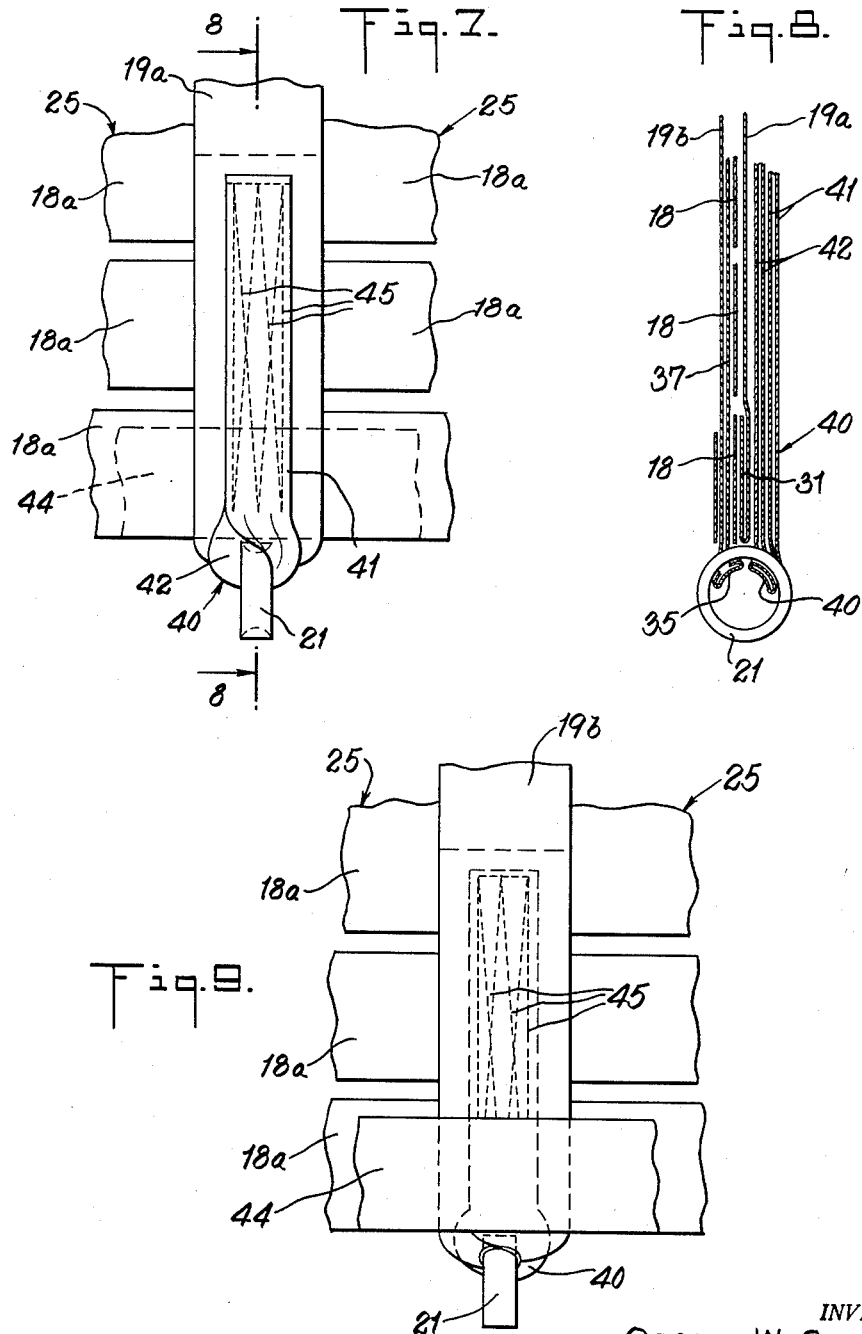

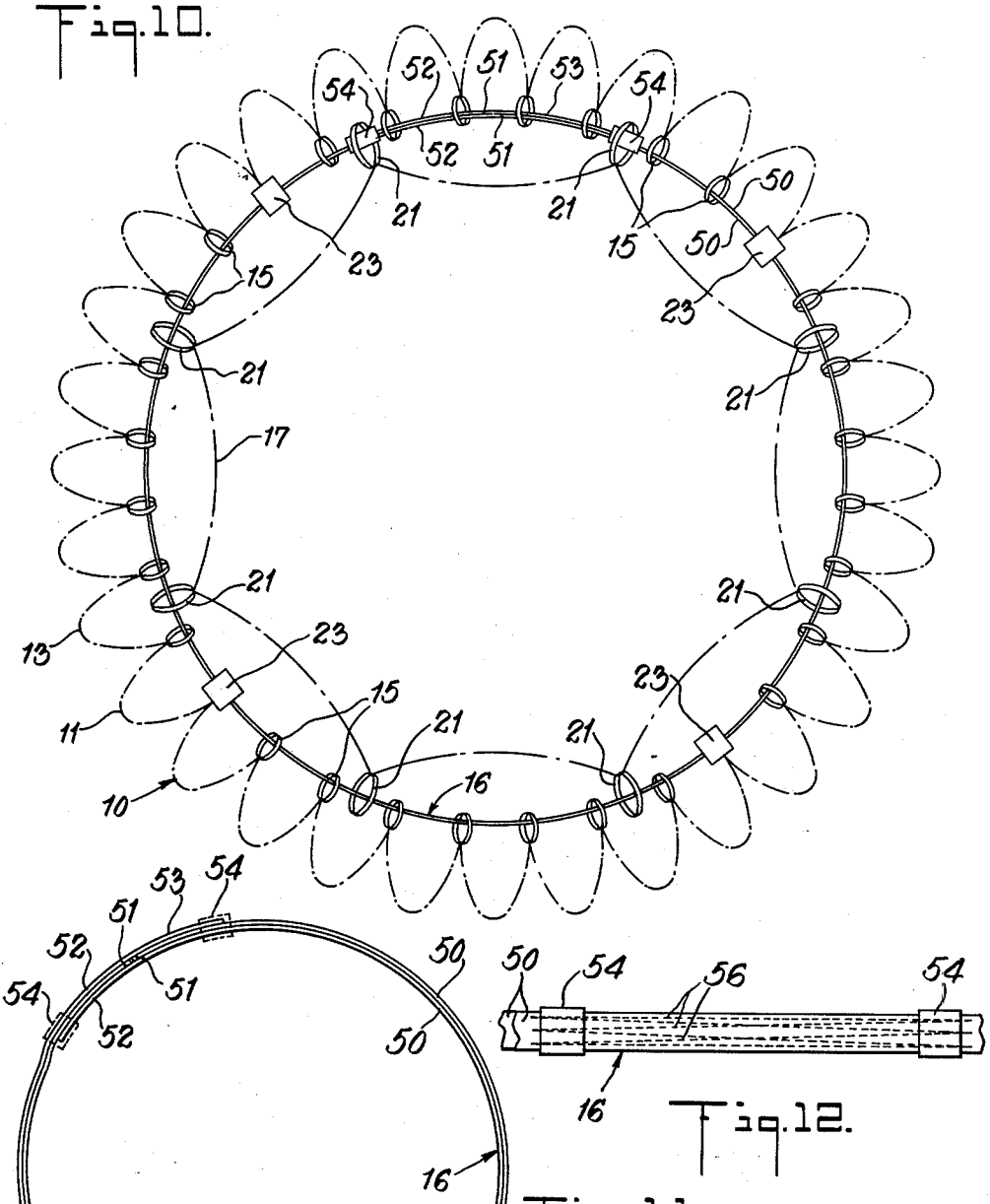
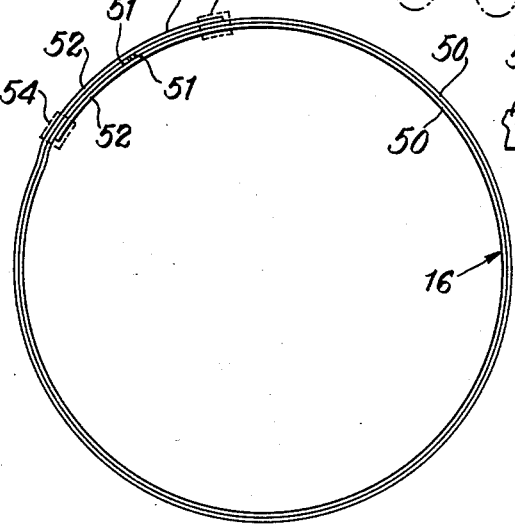

United States Patent Office 3,041,022
Patented June 26, 1962

3,041,022
PARACHUTES
Oscar W. Sepp, Jr., Merrick, N.Y., assignor to M. Steinthal & Co., Inc., New York, N.Y., a corporation of New York
Filed Mar. 21, 1961, Ser. No. 97,357
10 Claims. (Cl. 244—152)

The present invention relates to parachutes.

The forces imposed on a parachute during descent increases in direct proportion to the square of the increase in speed of the parachute. For that reason, a parachute dropping at high speed after release, must have considerable strength and a high safety factor to overcome the high forces and shocks incurred during its initial decelerating phase. This is especially true in connection with the safe recovery of important items usually released at high speeds such as missiles, rockets, rocket boosters, satellites or components thereof.

If a decelerating parachute of strong heavy construction for the initial high speed descending stage and a separate parachute of light-weight construction for a later lower speed descending stage are provided, such a two stage parachute system has the disadvantage of requiring numerous timing devices, and considerable volume, weight and associated stowage and deployment equipment to couple the parachutes for successive stage operations.

If a single parachute of high strength material is provided capable of withstanding the severe loads imposed during initial opening and deceleration of the parachute, such a parachute would have the disadvantage of possessing considerable weight and occupying considerable volume in the pack.

One object of the present invention is to provide a new and improved high speed parachute device, which has its main parachute parts of comparatively light-weight construction; which is capable of effectively withstanding the severe shocks and forces imposed during initial opening and deceleration of the parachute; and which is in the form of a unitary compact assembly requiring a minimum of mounting accessories and timing controls and occupying a minimum of pack storage space when not in use.

In accordance with certain features of the present invention, the parachute assembly comprises a parachute of light-weight construction for final recovery action and a parachute cap nested in the canopy of the parachute and secured to the parachute near the skirt region thereof. This parachute cap is of smaller diameter than the parachute in fully inflated condition of the cap and the parachute and is of sufficient high strength to withstand the shocks and forces developed during initial opening and deceleration of the parachute. The diameter of the cap is substantially equal to the diameter of the parachute when first deployed and when the parachute is beginning to open up, and since the parachute cap extends across the mouth of the parachute during this early high speed stage of descent, the parachute is spared the destructive effect of the dynamic pressures developed during this early stage. The parachute cap is desirably pervious to air, to permit this air acting on the parachute cap to pass therethrough and to be discharged against the canopy of the parachute at a greatly reduced pressure. This causes the parachute to open up under the action of this reduced air pressure, while the parachute cap is bearing the brunt of the high pressures initially developed. When the speed of descent of the parachute assembly has decreased to a point where the parachute of comparatively light construction can safely take over, the parachute cap is rendered inoperative.

Various other objects, features and advantages of the invention are apparent from the following description and from the accompanying drawings, in which FIG. 1 is a perspective of a parachute assembly soon after deployment before the parachute has been fully inflated and while the parachute cap is effective to withstand the shocks and forces during the initial opening and decelerating stage, parts of the parachute and parachute cap being shown broken away to reveal some of the internal structure of the assembly;

FIG. 2 is a perspective of the parachute cap shown fully inflated;

FIG. 3 is a side view partly diagrammatic showing the development of the parachute assembly from its initial opening stage indicated in dot and dash while the parachute is at least partially collapsed to the latter stage indicated in full line, after the parachute has become fully inflated and the parachute cap has been rendered inoperative;

FIG. 4 is a plan view of one of the double gores from which the parachute cap is formed;

FIG. 5 is a detail view showing in elevation one step in the method of assembling the part of the parachute cap adapted to be attached to the skirt of the parachute through a common reefing line;

FIG. 6 is a detail view showing in elevation a subsequent step in the method of assembling the part of the parachute cap adapted to be attached to the skirt of the parachute through a common reefing line;

FIG. 7 is an inside elevational detail view of the finished part of the parachute cap adapted to be attached to the skirt of the parachute through a common reefing line;

FIG. 8 is a detail section taken on lines 8—8 of FIG. 7;

FIG. 9 is an outside elevational detail view of the finished part of the parachute cap adapted to be attached to the skirt through a common reefing line;

FIG. 10 is a view looking up into the canopies of the parachute assembly showing the initial stage of development while the assembly is opening up and while the parachute cap is still in the operative state of withstanding the initial dynamic pressures imposed during initial opening and deceleration of the released parachute assembly;

FIG. 11 is an end view somewhat diagrammatic of the reefing line by which the parachute cap is detachably attached to the skirt of the parachute canopy in operative position of said cap; and FIG. 12 is a side detail view of the reefing line where different components are joined together.

Figure 1:
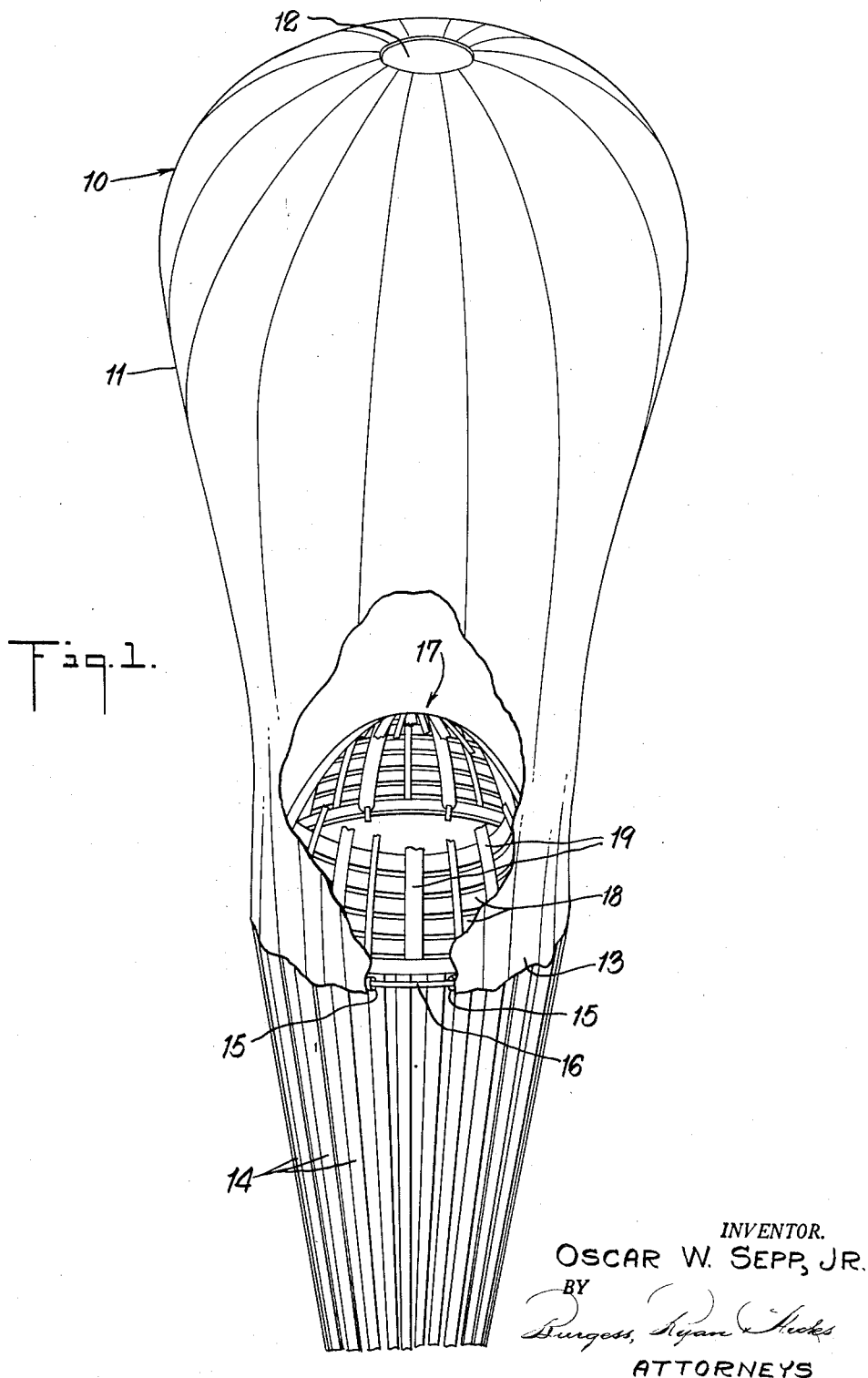

Referring to FIGS. 1, 3 and 10 of the drawings, the parachute assembly comprises a main parachute 10 of comparatively light construction having a fabric canopy 11 with an apex vent 12 and a skirt 13. Connected to this skirt 13 at equally spaced intervals are shroud or suspension lines 14 leading to a shackle (not shown) or other device for connection to a load.

Connected to the lower edge of the skirt of the parachute canopy 11 is a series of reefing rings 15 of rigid material such as metal, through which a flexible annular reefing line 16 extends before this parachute canopy is fully inflated. This reefing line 16 when fully expanded will have a diameter materially less than the diameter of the fully inflated parachute canopy 11. For example, in a specific embodiment of the invention, the reefing line 16 will have a diameter of about 2.4 feet when fully expanded and the parachute canopy 11 will have a diameter of about 16 feet when fully inflated. In such a specific embodiment, the skirt 13 of the parachute canopy 11 will carry twenty-eight reefing rings 15 and four reefing line cutters 23 to be described, these rings and cutters being equally spaced along said skirt.

Inside the parachute 10 is nested a parachute cap 17

(FIGS. 1, 2, 3 and 10) having a diameter when fully inflated materially less than the diameter of the fully inflated parachute canopy 11 and substantially equal to the diameter of the fully expanded reefing line 16. This parachute cap 17 is pervious to air, and for that purpose, is shown of open construction and more specifically of the ribbon type. The parachute cap 17 is made of such strong fabric as nylon, and its ribbon construction gives it the great strength necessary to resist the dynamic pressures developed during the initial descent stage.

More specifically, the parachute cap 17 comprises a series of horizontal ribbons 18 (FIG. 2) joined together by a series of radial ribbons 19. Openings 20 between the ribbons 18 and 19 form passageways through which air at high pressure is regulated for inflating action on the parachute canopy 11 at reduced pressure. The lowest horizontal ribbon 18 forming the skirt of the parachute cap 17 has a series of equally spaced reefing rings 21 of rigid material such as metal secured thereto, eight being shown in connection with the specific embodiment of the invention illustrated. These reefing rings 21 are impaled on the reefing line 16, so that the parachute cap 17 when fully expanded will extend across the full area of the mouth of the parachute canopy 11, while said mouth is held against full expansion by said reefing line, as shown in FIGS. 1 and 10 and in dot and dash lines in FIG. 3.

The apex section of the parachute cap 17 is loosely connected to one of the shroud lines 14 of the parachute 10 by a flexible bridle 22.

Four reefing line cutters 23 secured to the skirt 13 of the parachute canopy and quadrantly arranged are supported on the reefing line 16. The cutters 23 are in the form of tubes through which the reefing line 16 extends, so that they serve also as reefing rings, and are of well-known, automatic explosive type with a timing device to cut the reefing line 16 after a predetermined period of time has elapsed sufficiently to slow down the parachute assembly to the point where the parachute 10 can safely take over. At that instant the reefing line 16 is cut and the parachute 10 is permitted to receive the full impact of the air and to inflate to its full extent, while the parachute cap 17 is rendered inoperative but is still captive by its attachment to one of the shroud lines 14 of the bridle 22. The reefing line cutter 23 used may be similar to that disclosed in the publication M.R. No. TSEPE–672–25D entitled Reefing Methods—Parachute, issued by the United States Air Force, Air Material Command and dated October 28, 1947.

FIGS. 2, 4 to 9 show the method of assembling the parachute cap 17. This parachute cap 17 is made up of a plurality of double gores 25, each shown in FIG. 4 comprising a short radial double ribbon 19a and a long radial double ribbon 19b interconnected by a series of horizontal ribbon sections 18a and intersecting at the apex region 30 of the gore. The radial ribbons 19a and 19b define the radial ribbons 19 of the ultimate parachute cap 17 and the horizontal ribbon sections 18a when the gores 25 are assembled form the horizontal ribbons 18 of the cap.

The short radial ribbon 19a of each gore 25 extends beyond the ends of the main body of the gore to define two projecting tabs 31 at opposite ends of the gore and the long radial ribbon 19b of each gore extends beyond the ends of the main body of the gore to define two longer projecting tabs 32 at opposite ends of the gore. A vertical tape 33 midway between the radial ribbons 19a and 19b extends from the apex region 30 of the gore 25 to the skirt region of the gore, and the different radial ribbons 19a and 19b, horizontal ribbon sections 18a and radial tapes 33 are stitched together to form an integrated gore assembly.

In the specific embodiment of the invention, the parachute cap 17 is made up of four double gores 25 and these gores are assembled, so that the long radial ribbon 19b of one gore is laid over and in registry with the short radial ribbon 19a of the adjacent gore, and the shape of the gores 25 is such that when they are assembled and stitched together, they define a substantially hemispherical cap, as shown in FIG. 2.

FIGS. 5 to 9 show the different steps of attaching one of the reefing rings 21 to the skirt of the parachute cap 17. FIG. 5 shows adjoining gores 25 assembled with the short radial ribbon 19a of one gore inside and the long radial ribbon 19b of the adjacent gore on the outside superposed thereon and having its tab extension 32 projecting beyond the lowest substantially aligned horizontal ribbon sections 18a forming part of the parachute cap 17. Just below the lowest horizontal ribbon sections 18a, the radial ribbon tab 32 is hemmed with a constriction 35 for receiving the reefing ring 21, this construction being formed by turning over crescent-shaped side sections 36 of the tab and stitching them to the body of the tab. Since it is desirable to have the reefing ring 21 which is impaled on the tab 32 turned so that its axis is substantially coextensive with or substantially parallel to the reefing line 16, the lower section 37 of the tab 32 beyond the constriction 35 is folded upward and is twisted counterclockwise about ½ turn and inserted under the main section of the radial ribbon 19a, as shown in FIG. 6, until said twisted section is behind the main section of the tab. With this rear tab section 37 of the outer long radial ribbon 19b so twisted, the reefing ring 21 will be retained in this position with respect to the reefing line 16 with minimum of stress and distortion of the tab 32 or the reefing line 16.

The tab 31 of the short inner radial ribbon 19a is folded outwardly against the overlapping bottom horizontal ribbon sections 18a, these overlapping sections being shown as a single ribbon layer in FIG. 8 for the sake of simplicity.

With the gores 25 collected, and the radial ribbons 19a and 19b arranged and folded together as described, a reefing ring retainer 40 (FIGS. 7, 8 and 9) for each reefing ring 21 is grouped with this assembly. For that purpose, the ring retainer 40 in the form of a tape and more specifically in the form of a flexible tube of strong fabric material, such as nylon, passes through the reefing ring 21 and is folded to define an inner section 41 and an outer section 42. The inner section 41 is flattened while the outer section 42 is also flattened but is twisted half a turn counterclockwise and inserted in front of the outer section as in the case of the radial ribbon tab section 37. With the ring retainer 40 twisted and arranged as described, the reefing ring 21 will be turned with its axis substantially coextensive with or substantially parallel to the reefing line 16, so that the reefing ring 21 will be retained in this position with the minimum of stress or distortion of the ring retainer 40 or the reefing line.

A horizontal reinforcing tape 44 is placed on the outside of the bottom horizontal skirt ribbon 18 against the outside of the long radial ribbon 19b to circumvent the full extent of said ribbon and to thereby reinforce said ribbon.

With the parts of the parachute cap 17 assembled as described and shown in FIGS. 5 to 9, these parts are secured together by stitching 45. The reefing rings 21 with the parachute cap 17, mounted as described, will be supported primarily by the ring retainers 40 and secondarily by the long radial ribbons 19b.

The reefing line 16 is shown in FIGS. 11 and 12 comprising two webbings 50, each having its opposite ends overlapping and stitched together to form a continuous band. The two bands are arranged face to face with the ends 51 of the webbings 50 abutting and located between two flanking layers 52 of the webbings. The resulting assembly will have a section 53 consisting of three layers, and wrapped tightly around the ends of this section are two tapes 54 to form keepers for said section. Stitching 56 connects the webbings 50 and the wrapped tapes 54 together to form the unitary reefing ring 16.

The bridle 22 (FIG. 2) is constructed from a tape folded and stitched to form a loop 60 passing through the apex region 30 of the parachute cap 17, and a smaller loop 61 for receiving one of the shroud lines 14 of the parachute 10, as shown in FIG. 2. A sleeve 62 along the loop 60 serves to prevent twisting of the tape in the apex region 30 of the parachute cap 17.

The parachute assembly is packed and is deployed and released from the pack in the manner well known in the art. The parachute 10 would have a load connected to its shackle, as for example, a missile, rocket, rocket booster, satellite or component thereof, and would be deployed while this load is descending at great speed. The parachute cap 17 immediately opens up, taking on thereby the brunt of the dynamic pressures developed during the initial high speed descent stage. The parachute cap 17 being of strong construction, it can effectively withstand these pressures. Some of the air acting on the parachute cap 17 passes through the openings 20 thereof at reduced pressure, and this air serves to partially open the parachute 10, as shown in FIGS. 1 and 10 and in dot and dash lines in FIG. 3. After the parachute assembly has been slowed in its descent to the point where the parachute 10 of comparatively light construction can take over, the cutters 23 are activated to cut the reefing line 16, thereby permitting the parachute 10 to inflate completely, as shown in full lines in FIG. 3, while the parachute cap 17 still captive is rendered inactive inside the parachute canopy 11.

While the invention has been described with particular reference to a specific embodiment it is to be understood that it is not to be limited thereto but is to be construed broadly and restricted solely by the scope of the appended claims.

What is claimed is:

1. A parachute assembly comprising a parachute having a canopy with a skirt, a parachute cap nested inside said parachute canopy and having a skirt, an annular flexible reefing line, and means connecting said skirts to and along said reefing line, said reefing line being adapted to be severed after an initial period of descent.

2. A parachute assembly comprising a parachute having a canopy with a skirt, a parachute cap nested inside said parachute canopy and having a skirt, said cap in fully inflated condition having a diameter less than that of the fully inflated parachute canopy, an annular flexible reefing line having in fully expanded condition a diameter substantially equal to that of the fully inflated cap, and means connecting said skirts to and along said reefing line, said reefing line being adapted to be severed after an initial period of descent.

3. A parachute assembly as described in claim 2, said parachute cap being strong enough to withstand the dynamic pressures developed during initial descent and being rendered inoperative upon severance of the reefing line to permit the parachute to retard the falling speed of a load connected to said parachute for recovery.

4. A parachute assembly as described in claim 2, said parachute cap being strong enough to withstand the dynamic pressures developed during initial descent and being rendered inoperative upon severance of the reefing line to permit the parachute to retard the falling speed of a load connected to said parachute for recovery, said cap being pervious to air to permit said parachute to be partially inflated by the air acting on the cap but at a reduced pressure before severance of said reefing line.

5. A parachute assembly as described in claim 4, wherein the parachute cap is of the ribbon type.

6. A parachute assembly comprising a parachute having a canopy with a skirt, a parachute cap nested inside said parachute canopy and having a skirt, an annular flexible reefing line, a set of reefing rings secured to the skirt of said canopy at spaced points therealong, said reefing line passing through said set of reefing rings, a separate set of reefing rings secured to the skirt of said cap at spaced points therealong, said reefing line passing also through said separate set of reefing rings, and a reefing line cutter for severing the reefing line after an initial period of descent.

7. A parachute assembly comprising a parachute having a canopy with a skirt, a parachute cap of the strong ribbon air pervious type nested inside said parachute canopy and having a skirt, said cap in fully inflated condition having a diameter substantially less than that of the fully inflated parachute canopy, an annular flexible reefing line having in fully expanded condition a diameter substantially equal to that of the fully inflated cap, a set of reefing rings secured to the skirt of said canopy at spaced points therealong, said reefing line passing through said set of reefing rings and gathering said canopy skirt about said reefing line during the initial period of descent, a separate set of reefing rings secured to the skirt of said cap at spaced points therealong, said reefing line passing also through said separate set of reefing rings, and a reefing line cutter on said reefing line for severing said reefing line after a predetermined period of descent.

8. A parachute assembly comprising a parachute having a canopy with a skirt and shroud lines, a parachute cap nested inside said parachute canopy and having a skirt, said cap in fully inflated condition having a diameter less than that of the fully inflated parachute canopy, a flexible bridle connection between the apex of said cap and one of said shroud lines, an annular flexible reefing line having in fully expanded condition a diameter substantially equal to that of the fully inflated cap, and means connecting said skirts to and along said reefing line, said reefing line being adapted to be severed after an initial period of descent.

9. A parachute assembly comprising a parachute having a canopy with a skirt, a parachute cap nested inside said parachute canopy and having a skirt, said parachute cap comprising a plurality of similar double gores, each comprising a pair of spaced radial ribbons interconnected by a plurality of horizontal ribbon sections, said gores being arranged side by side with the radial ribbon of one gore superposed on the radial ribbon of the other gore, one radial ribbon of each gore extending beyond the end of the gore to define a tab, an annular flexible reefing line, a series of reefing rings secured to the skirt of said cap at spaced points therealong, each of said tabs passing through a respective one of said reefing rings and having its outer end section stitched to the body of the radial ribbon defining said tab, said reefing line passing through said series of reefing rings, a second series of reefing rings secured to the skirt of said parachute canopy at spaced points therealong, said reefing line also passing through the latter series of reefing rings, and a reefing line cutter on said line for severing said reefing line after a predetermined initial period of descent.

10. A parachute assembly comprising a parachute having a canopy with a skirt, a parachute cap nested inside said parachute canopy and having a skirt, said cap comprising a series of horizontal ribbons interconnected by a series of radial ribbons, an annular reefing line, a series of reefing rings through which said reefing line passes, reefing ring retainers for said rings, each comprising a tape passing through a corresponding reefing ring and having its end sections stitched to a corresponding radial ribbon, a second series of reefing rings secured to the skirt of said parachute and impaled upon said reefing line, and a reefing line cutter on said reefing line for severing said reefing line after a predetermined initial period of descent.

References Cited in the file of this patent
UNITED STATES PATENTS 2,566,585    Smith _____ Sept. 4, 1957
2,952,429    Kostelezky _____ Sept. 13, 1960